United States Patent
Eglin et al.

(10) Patent No.: US 11,634,209 B2
(45) Date of Patent: Apr. 25, 2023

(54) METHOD FOR CONTROLLING AT LEAST ONE AERODYNAMIC STABILIZER MEMBER OF A HYBRID HELICOPTER, AND A HYBRID HELICOPTER

(71) Applicant: AIRBUS HELICOPTERS, Marignane (FR)

(72) Inventors: Paul Eglin, Roquefort la Bedoule (FR); Remy Huot, Marseilles (FR); Antoine Conroy, Vitrolles (FR)

(73) Assignee: AIRBUS HELICOPTER, Marignane (FR)

( * ) Notice: Subject to any disclaimer, the term of this patent is extended or adjusted under 35 U.S.C. 154(b) by 83 days.

(21) Appl. No.: 17/198,329

(22) Filed: Mar. 11, 2021

(65) Prior Publication Data
US 2021/0284326 A1      Sep. 16, 2021

(30) Foreign Application Priority Data
Mar. 12, 2020   (FR) ..................................... 2002441

(51) Int. Cl.
| | |
|---|---|
| *B64C 13/18* | (2006.01) |
| *B64C 5/10* | (2006.01) |
| *B64C 11/30* | (2006.01) |
| *B64C 13/24* | (2006.01) |
| *B64C 11/00* | (2006.01) |
| *B64C 27/06* | (2006.01) |

(52) U.S. Cl.
CPC ................ *B64C 13/18* (2013.01); *B64C 5/10* (2013.01); *B64C 11/00* (2013.01); *B64C 11/30* (2013.01); *B64C 13/24* (2013.01); *B64C 27/06* (2013.01)

(58) Field of Classification Search
CPC .. B64C 13/18; B64C 5/06; B64C 5/10; B64C 13/24; B64C 11/30
See application file for complete search history.

(56) References Cited

U.S. PATENT DOCUMENTS

| | | |
|---|---|---|
| 5,388,785 A | 2/1995 | Rollet et al. |
| 6,142,413 A | 11/2000 | Dequin et al. |
| 8,052,094 B2 | 11/2011 | Roesch |
| (Continued) | | |

FOREIGN PATENT DOCUMENTS

| | | |
|---|---|---|
| FR | 2689854 A1 | 10/1993 |
| FR | 2769284 A1 | 4/1999 |
| (Continued) | | |

OTHER PUBLICATIONS

French Search Report for French Application No. FR2002441, Completed by the French Patent Office, dated Jan. 28, 2021, 10 pages.

*Primary Examiner* — Joshua J Michener
*Assistant Examiner* — Cindi M Curry
(74) *Attorney, Agent, or Firm* — Brooks Kushman P.C.

(57) ABSTRACT

A method for optimizing the operation of at least one first propeller and of at least one second propeller of a hybrid helicopter. The method comprises the following step during a control phase: deflection, with an autopilot system, of at least one aerodynamic stabilizer member into a setpoint position having, with respect to a reference position, a target deflection angle that is a function of a setpoint deflection angle, the setpoint deflection angle being calculated by the autopilot system in order to compensate for a torque exerted by the lift rotor at zero sideslip.

20 Claims, 3 Drawing Sheets

(56) References Cited

U.S. PATENT DOCUMENTS

| | | | |
|---|---|---|---|
| 8,113,460 B2 | 2/2012 | Roesch | |
| 8,170,728 B2 | 5/2012 | Roesch | |
| 8,181,901 B2 | 5/2012 | Roesch | |
| 2010/0243792 A1* | 9/2010 | Queiras | B64C 27/26 244/6 |
| 2015/0158580 A1 | 6/2015 | Kelaidis | |
| 2018/0244369 A1 | 8/2018 | Alfred et al. | |
| 2021/0284326 A1* | 9/2021 | Eglin | B64C 13/18 |

FOREIGN PATENT DOCUMENTS

| | | | |
|---|---|---|---|
| FR | 2943620 A1 | 10/2010 | |
| FR | 3014411 A1 | 6/2015 | |

\* cited by examiner

METHOD FOR CONTROLLING AT LEAST ONE AERODYNAMIC STABILIZER MEMBER OF A HYBRID HELICOPTER, AND A HYBRID HELICOPTER

CROSS-REFERENCE TO RELATED APPLICATIONS

This application claims priority to European patent application No. FR 2002441 filed on Mar. 12, 2020, the disclosure of which is incorporated in its entirety by reference herein.

BACKGROUND OF THE INVENTION

(1) Field of the Invention

The present invention relates to a method for controlling at least one aerodynamic stabilizer member of a hybrid helicopter, and also to a hybrid helicopter applying this method. The invention lies in the technical field of control systems for a hybrid helicopter.

The project leading to this invention received funding from the European Union Framework Programme for Research and Innovation Horizon 2020, through the grant agreement CleanSky 2 No. GAM-FRC 2014 001 Issue E.

(2) Description of Related Art

One type of rotorcraft may be referred to, for convenience, as a "hybrid helicopter", due to its specific nature. A hybrid helicopter has an airframe carrying at least one rotary wing provided with a rotor, that rotor being referred to hereinafter, for convenience, as a "lift rotor", due to at least one function that it performs. The lift rotor helps at least provide lift for the aircraft, and indeed can also help propel it forward.

A hybrid helicopter further includes at least one propeller, possibly of the tractor or pusher propeller type. For example, the hybrid helicopter may be provided with at least two propellers arranged transversely on either side of an airframe and of its anteroposterior plane.

Furthermore, a hybrid helicopter includes a power plant for setting in motion the propeller or propellers and the lift rotor, optionally continuously except in the event of failure or during testing.

To pilot a hybrid helicopter, a pilot of the hybrid helicopter can operate a first control and a second control for respectively controlling, collectively and cyclically, the pitch of the blades of the lift rotor, for example via a mechanical and/or electrical architecture. The first control is referred to, for convenience, as the "collective pitch control" and often takes the form of a lever referred to as the "collective pitch lever". The second control is referred to, for convenience, as the "cyclic pitch control" and often takes the form of a stick referred to as the "cyclic stick".

In particular on a hybrid helicopter having at least two propellers situated on either side of an airframe, the pitch of the blades of each propeller is a function of a mean pitch component and of a differential pitch component. Thus, the first pitch of the first blades of a first propeller may be equal to the sum of the mean pitch component plus the differential pitch component while the second pitch of the second blades of a second propeller may be equal to the mean pitch component minus the differential pitch component. Furthermore, the mean pitch component may be equal to the half-sum of the first and second pitches of the two propellers while the differential pitch component may be equal to the half-difference of the first and second pitches of the two propellers.

In this situation, the hybrid helicopter includes at least one thrust control suitable for modifying the value of the mean pitch component, for example via a mechanical and/or electrical architecture.

For example, the thrust control may be in the form of a lever or of a button that transmits a signal to one or more actuators. In one example, such a button may have three discrete states, namely a "beep+" first state requesting an increase in the value of the mean pitch component, a "beep−" second state requesting a reduction in the value of the mean pitch component, and a third state requesting no change in the value of the mean pitch component. The pitch of the blades of the propellers is thus increased as long as a pilot positions the button in its first state. In another example, the button may be in the form of a thumbwheel.

Furthermore, directional control functions, in particular for yaw control, can be performed by using a yaw control suitable for modifying the value of the differential pitch component. For example, such a yaw control may comprise a rudder bar connected via a mechanical and/or electrical architecture to the propellers. The rudder bar allows the value of the differential pitch component to be modified.

Examples of hybrid helicopters are described, for example, in documents U.S. Pat. Nos. 8,181,901, 8,170,728, 8,052,094, and 8,113,460

On a hybrid helicopter provided with two propellers which help control the position and yaw movement, the two propellers can generate two different thrusts in order to generate torque on the airframe of the aircraft.

This strategy is advantageous but can in fact result in different life cycles for the various movable members putting the blades of the propellers into motion.

To remedy this, document FR 2 943 620 proposes to control the deflection angle of left and right flaps during predetermined phases of flight in order to tend to minimize the differential pitch component of the left and right propellers in order to optimize the operation of these left and right propellers.

For convenience and in the remainder of the text, it is considered that the left of an aircraft is situated to the left of an individual located in said aircraft with his or her back turned to the rear of the aircraft so as to face towards the front of the aircraft. Similarly, it is considered that the right of an aircraft is situated to the right of an individual located in said aircraft with his or her back turned to the rear of the aircraft so as to face towards the front of the aircraft. Control is effected via a first closed control loop as a function of a difference in torque, power or pitch.

The deflection of the left and right flaps may be accompanied by a second closed control loop for controlling the propellers in order to achieve a zero lateral load factor. As a result, the first and second control loops may tend to operate in mutual interaction under certain conditions.

Documents FR 2 769 284, FR 3 014 411, FR 2 689 854 and US 2018/244369 are also known and far removed from the invention, since they concern conventional helicopters devoid of propellers.

BRIEF SUMMARY OF THE INVENTION

The aim of the present invention is therefore to propose an alternative method that makes it possible to optimize the operation of the propellers of a hybrid helicopter having a lift rotor driven by a power plant during at least one flight phase.

Thus, the invention proposes a method for optimizing the operation of at least one first propeller and of at least one second propeller, which propellers are arranged transversely on either side of an airframe of a hybrid helicopter, said hybrid helicopter including a lift rotor arranged above the airframe, said hybrid helicopter including at least one aerodynamic stabilizer member exerting a transverse lift, said at least one aerodynamic stabilizer member being able to rotate relative to a support of said hybrid helicopter.

Such an aerodynamic stabilizer member may, for example, be in the form of a fully deflectable empennage or a deflectable flap of an empennage.

This method comprises the following step during a control phase: deflection, with an autopilot system, of said at least one aerodynamic stabilizer member into a setpoint position having, with respect to a reference position, a target deflection angle, said target deflection angle being equal to a setpoint deflection angle at least when this setpoint deflection angle is within a range delimited by a predetermined minimum included angle and a predetermined maximum included angle.

Optionally, the target deflection angle may be equal to said predetermined maximum angle when this setpoint deflection angle is greater than the predetermined maximum angle. Optionally, the target deflection angle may be equal to said predetermined minimum angle when this setpoint deflection angle is less than the predetermined minimum angle. The setpoint deflection angle may also be limited.

The setpoint deflection angle is calculated by the autopilot system in order to compensate for a torque exerted by said lift rotor at zero sideslip.

The deflection angle is conventionally positive when the aerodynamic stabilizer member is situated to a first side of the reference position and negative when the aerodynamic stabilizer member is situated to a second side of the reference position.

Consequently, the hybrid helicopter is provided with one or more aerodynamic stabilizer members capable of generating a yaw moment on the airframe. The aerodynamic stabilizer member or members are controlled by the autopilot system such that they tend to reach a setpoint deflection angle. Consequently, the deflection can be achieved by means of an open control loop which thus does not run the risk of coming into conflict with a possible closed control loop controlling a differential pitch component of the propellers in order to obtain a zero lateral load factor.

The setpoint deflection angle is thus calculated so as to compensate exactly for the torque exerted by said lift rotor on the airframe at zero sideslip such that the first pitch of the first blades of the first propeller and the second pitch of the second blades of the second propeller tend to have a zero differential pitch component. The setpoint deflection angle and/or the target deflection angle shall be capped/limited, where appropriate, by the maximum angle and the minimum angle.

Consequently, the value of the target deflection angle can vary in conjunction with variations in the torque exerted by the lift rotor on the airframe or with the dynamic pressure. Such variations may be the result of an action of a pilot on a collective pitch or cyclic pitch control of the lift rotor or of an equivalent action taken by the autopilot system.

Consequently, the open-loop control of the deflection angle of the aerodynamic stabilizer member or members can allow substantially the same pitch to be obtained on each propeller and therefore optimum behavior at their operating point. Indeed, the first pitch of the first blades of the first propeller may be close to or even equal to the second pitch of the second blades of the second propeller. The first propeller and the second propeller may also be identical.

It should be noted that the pitch of a blade of a propeller represents an angle between a line of a section of the blade and a reference line, this angle varying when the blade rotates on itself about its blade pitch axis. For example, the pitch represents an angle separating a chord line of a section from a reference position of this chord line. For example, said section may be a section situated at a distance equal to 0.75 times the radius of the propeller from the axis of rotation of the propeller.

The method may also include one or more of the following characteristics.

Thus, the method may include the following step: calculation of said setpoint deflection angle, with the autopilot system, as a function at least of a forward speed of the hybrid helicopter, of a torque exerted by the lift rotor on the airframe and of a volumic mass of the air surrounding the hybrid helicopter.

Consequently, if the altitude or speed of the hybrid helicopter changes, the deflection angle of the aerodynamic stabilizer member is automatically modified, at least as long as this aerodynamic stabilizer member does not reach an abutment. Similarly, a modification of the torque exerted by the lift rotor on the airframe results in a modification of the setpoint deflection angle. The first thrust may then remain substantially equal to the second thrust.

For example, the method may include a step of calculating said setpoint deflection angle, with the autopilot system, by means of the following relation:

$$\text{delta}V = (C/(0.5 * ro * v^2) - N1)/N2,$$

where "deltaV" represents said setpoint deflection angle, "C" represents a torque exerted by the lift rotor on the airframe, "$V^2$" represents a forward speed of the hybrid helicopter, squared, "ro" represents a volumic mass of the air, "$0.5 * ro * v^2$" represents a dynamic pressure, "N1" represents a first coefficient which is a function of an aerodynamic yaw moment N0 of the hybrid helicopter at zero sideslip and, when said at least one aerodynamic stabilizer member is in the reference position, reduced by the dynamic pressure, "N2" represents a second coefficient equal to a constant, "/" represents the division sign, "−" represents the subtraction sign, "*" represents the multiplication sign, "=" represents the equals sign.

Indeed, the yaw moment M generated by the airframe and in particular via the aerodynamic stabilizer member or members can be determined as for an airplane by the following equation:

$$M = 0.5 * ro * V^2 * (N1 + N2 * \text{delta}V)$$

Therefore, in order to equalize the thrust of the propellers at zero sideslip during cruising, the yaw moment must exactly compensate for the torque exerted by the lift rotor so as not to need to produce a differential thrust between the propellers, i.e., M=C. The above relation is deduced therefrom:

$$\text{delta}V = (C/(0.5 * ro * v^2) - N1)/N2$$

The first coefficient is a function of a term depending on the aerodynamic yaw moment N0 of the hybrid helicopter at zero sideslip and, when said at least one aerodynamic stabilizer member is in the reference position, reduced by the dynamic pressure q, i.e., N0/q. This term N0/q may be a constant determined by wind tunnel tests and/or by calculations and/or by simulations.

Similarly, the second coefficient N2 may represent a gradient of said aerodynamic yaw moment of the hybrid helicopter by degree of deflection of said at least one aerodynamic stabilizer member and may be determined by wind tunnel tests and/or by calculations and/or by simulations.

According to a first alternative, the first coefficient is equal to the aerodynamic yaw moment of the hybrid helicopter at zero sideslip and, when said at least one aerodynamic stabilizer member is in the reference position, reduced by the dynamic pressure.

According to a second alternative, the first coefficient may be equal to the aerodynamic yaw moment of the hybrid helicopter at zero sideslip and, when said at least one aerodynamic stabilizer member is in the reference position, reduced by the dynamic pressure and corrected by an integral corrector, this corrector being a function of a gain as well as of a subtraction either of a first pitch PAS1 of first blades of said at least one first propeller minus a second pitch PAS2 of second blades of said at least one second propeller, or of a first thrust P1 exerted by said at least one first propeller minus a second thrust P2 exerted by said at least one second propeller, or of a first torque Tq1 exerted by said at least one first propeller minus a second torque Tq2 exerted by said at least one second propeller.

The hybrid helicopter may be subject to aerodynamic interactions likely to affect the first coefficient. In order to take these interactions into account, a corrector in the form of an integral term may be added to the aerodynamic yaw coefficient reduced by the dynamic pressure, at zero sideslip and when said at least one aerodynamic stabilizer member is in the reference position, in order to optimize the efficiency of the method.

Optionally, the corrector may be capped in order to prevent it from increasing indefinitely in absolute value when the maximum angle of the aerodynamic stabilizer member is reached, for example. Possibly, the value of the corrector is limited within a range of values narrower than the range delimited by the minimum angle and the maximum angle. By way of illustration, the setpoint deflection angle may be between 8 degrees and +8 degrees about the reference position, the corrector only being able to be between 2 degrees and +2 degrees.

For example, said first coefficient is determined by the following relation:

$$N1 = (N0/q) + k*\text{int}(\text{diff}),$$

where "N1" represents the first coefficient, "N0/q" represents the aerodynamic yaw moment N0 of the hybrid helicopter reduced by the dynamic pressure q at zero sideslip and when said at least one aerodynamic stabilizer member is in the reference position, "diff" represents said subtraction, "k" represents a predetermined gain, "−" represents the subtraction sign, "+" represents the addition sign, "*" represents the multiplication sign, "=" represents the equals sign, "k*int(diff)" represents the integral corrector equal to the product of said predetermined gain and an integral with respect to the time of said subtraction.

The gain k can be adjusted to avoid interaction with a lateral load factor control loop.

Optionally, the gain may vary as a function of a forward speed of the hybrid helicopter.

The gain k may be a function of the forward speed, for example the true airspeed or the indicated airspeed. In particular, the gain can be reduced at high speed when the efficiency of the aerodynamic stabilizer member is at a maximum.

In one aspect, however, the corrector may be frozen when the hybrid helicopter is in a dynamic piloting phase.

The term "frozen" means that the corrector as a whole retains the value reached when the hybrid helicopter enters a dynamic piloting phase. The corrector may vary again after the dynamic piloting phase.

The method may include a step of detecting a dynamic piloting phase if at least one of the following conditions is satisfied:

maneuvering of a yaw control configured to modify a differential pitch component of the first pitch of first blades of said at least one first propeller and of the second pitch of second blades of said at least one second propeller;

an absolute value of a load factor in a transverse direction in a reference frame of the hybrid helicopter is greater than a load factor threshold; and an absolute value of a roll angle of the hybrid helicopter is greater than a roll threshold.

For example, the load factor threshold may be equal to 0.07 times the acceleration of gravity.

For example, the roll threshold may lie in the range between 10 and 40 degrees.

Similarly, a dead zone that freezes the integral corrector may be established under certain conditions.

For example, the corrector may be frozen when an absolute value of a difference is less than a freeze threshold, said difference being equal:

to the first pitch PAS1 of first blades of said at least one first propeller minus the second pitch PAS2 of second blades of said at least one second propeller, i.e., PAS1-PAS2;

or to a first thrust P1 exerted by said at least one first propeller minus a second thrust P2 exerted by said at least one second propeller, i.e., P1-P2;

or to a first torque TQ1 exerted by said at least one first propeller minus a second torque TQ2 exerted by said at least one second propeller, i.e., TQ1-TQ2.

In another aspect, said control phase may be implemented when said hybrid helicopter is carrying out a cruising flight phase.

Such a cruising flight phase can be detected in the usual manner.

Furthermore, the deflection of said at least one aerodynamic stabilizer member into a setpoint position, with the autopilot system, can be achieved by applying an open control loop.

In addition to a method, the invention relates to a hybrid helicopter which applies this method.

Such a hybrid helicopter is provided with at least one first propeller and with at least one second propeller, which propellers are arranged transversely on either side of an airframe of this hybrid helicopter, said hybrid helicopter including a lift rotor arranged above the airframe, said hybrid helicopter including at least one aerodynamic stabilizer member exerting a transverse lift, said at least one aerodynamic stabilizer member being able to rotate relative to a support of said hybrid helicopter.

The hybrid helicopter includes an autopilot system configured to apply this method.

The autopilot system may include a flight control computer configured to apply the method of the invention.

In one aspect, the autopilot system may include at least one actuator connected to said at least one aerodynamic stabilizer member and to the flight control computer.

The flight control computer may be mechanically connected to the actuator and/or may transmit an electrical, optical, analog or digital signal to the actuator in order to move said at least one aerodynamic stabilizer member.

The autopilot system may comprise at least one instance of at least one of the following components connected to the flight control computer: a speed sensor, a torque sensor configured to measure information relating to a torque exerted by the lift rotor, a first sensor for detecting the first pitch of first blades of said at least one first propeller, a second sensor for detecting the second pitch of second blades of said at least one second propeller, a maneuvering sensor for determining whether a pilot is maneuvering a yaw control, a sensor for measuring a load factor in a transverse direction in a reference frame of the hybrid helicopter, an angular roll sensor measuring a roll angle of the hybrid helicopter, first and second torque sensors for detecting the torque respectively of said at least one first propeller and of said at least one second propeller, a first thrust sensor for evaluating a first thrust generated by said at least one first propeller, a second thrust sensor for evaluating a second thrust generated by said at least one second propeller.

For example, the speed sensor may measure a forward speed of the hybrid helicopter, i.e., the true airspeed or the indicated airspeed IAS of the hybrid helicopter. This speed sensor can be obtained with the measurement instrument referred to as an "AIR DATA COMPUTER" by a person skilled in the art, a satellite positioning system, a pressure measurement system, etc.

In one aspect, the torque sensor may, for example, include a torquemeter. According to one possibility, a torquemeter may be arranged on a rotor mast of the lift rotor or equivalent.

Likewise, the first and second torque sensors may include torquemeters arranged on a propeller mast or the like.

For example, the first sensor for detecting the first pitch may include a position sensor that measures a position of a movable member that controls the first pitch of the first propeller, for example a first control rod for controlling the first pitch. The same applies to the second sensor for detecting the second pitch. For example, each pitch sensor comprises a sensor known by the acronym LVDT, corresponding to the expression "Linear Variable Differential Transformer" or RVDT, corresponding to the expression "Rotary Variable Differential Transformer".

Furthermore, the first thrust sensor and the second thrust sensor may respectively comprise a first tension/compression sensor arranged on a first mast of the first propeller and a second tension/compression sensor arranged on a second mast of the second propeller. Indeed, the force measured on each mast is representative of the thrust of the associated propeller. Thus, a computer can apply at least one law providing the thrust of a propeller as a function of the force measured.

In another example, the first thrust sensor and the second thrust sensor may comprise, respectively, two sensors for measuring the speed of rotation of the first propeller and of the second propeller. Indeed, the thrust of a propeller may be calculated using a predetermined law providing this thrust as a function of the rotational speed of the propeller measured with a sensor for measuring the rotational speed, the forward speed measured with the speed sensor, the volumic mass of the air and the pitch of the blades of the propeller.

Furthermore, a maneuvering sensor may, for example, comprise a force sensor capable of determining whether a pilot is exerting a force on the yaw control, and, for example, a force sensor arranged on a rudder bar or on a member mechanically connected to the rudder bar. Alternatively, a position or acceleration sensor may be used, for example.

The load factor measuring sensor may, for example, be provided with an acceleration sensor measuring the load factor of the hybrid helicopter in a transverse direction, i.e., in a direction substantially parallel to the pitch axis of the hybrid helicopter.

In another example, the angular sensor may comprise an inclinometer or may form part of the measuring instrument referred to as the "Attitude and Heading Reference System".

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
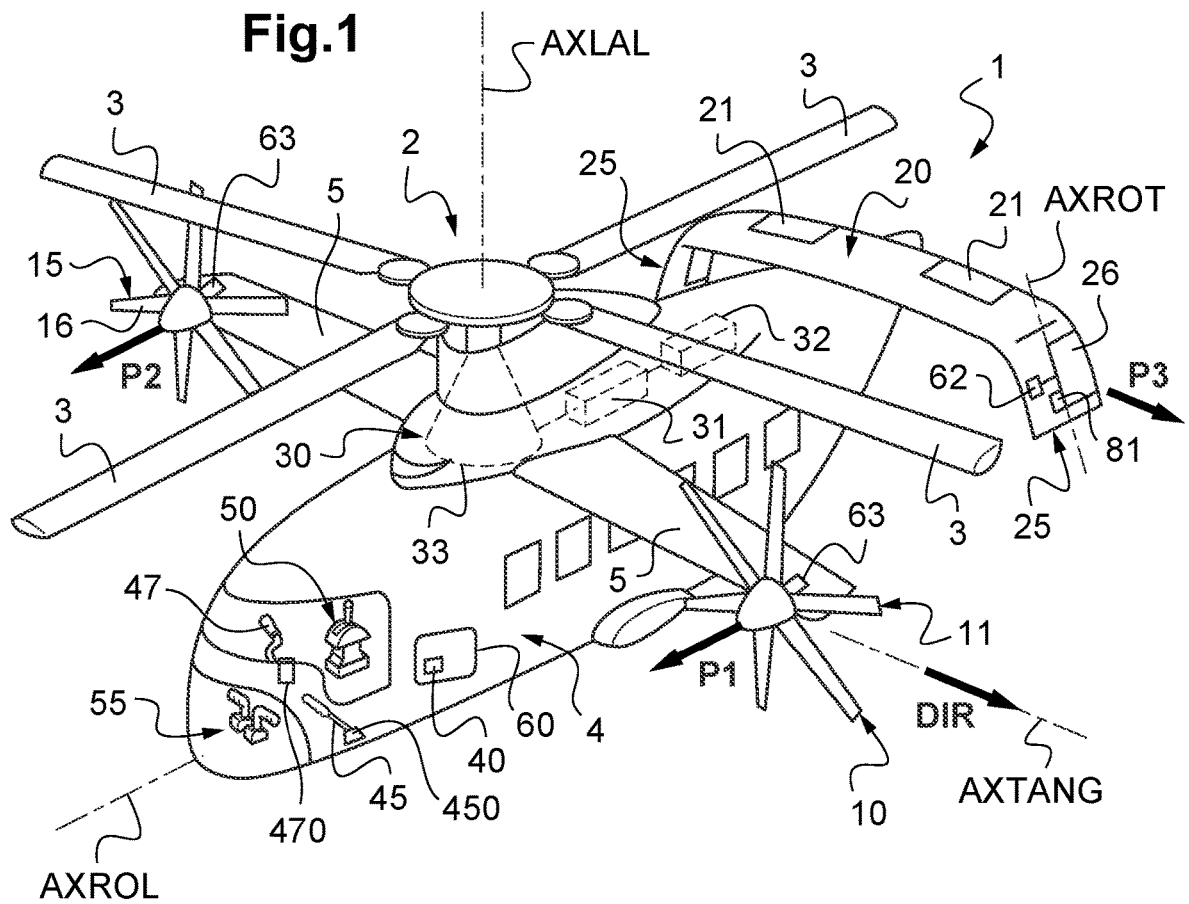
FIG. 1 is a perspective view of a hybrid helicopter according to the invention.

FIG. 1 shows a hybrid helicopter 1 according to the invention.

This hybrid helicopter 1 has an airframe 4 above which at least one lift rotor 2 is arranged. This lift rotor 2 is provided with a plurality of blades referred to for convenience as "main blades 3". The airframe 4 extends longitudinally parallel to a roll axis AXROL of the hybrid helicopter 1, transversely parallel to a pitch axis AXTANG of the hybrid helicopter 1 and in elevation parallel to a yaw axis AXLAL of the hybrid helicopter 1.

In addition, the hybrid helicopter 1 is provided with at least one first propeller 10 and with at least one second propeller 15, the propellers being of the tractor type or of the pusher type. The first and second propellers 10, 15 respectively have a plurality of first blades 11 and a plurality of second blades 16. The first propeller 10 and the second propeller 15 may be arranged laterally relative to the airframe 4, optionally on either side of an anteroposterior plane of the hybrid helicopter 1, parallel to the pitch axis AXTANG. In FIG. 1, the first and second propellers 10, 15 may be reversed. The first and second propellers 10, 15 are optionally carried by a support 5. Such a support 5 may optionally be aerodynamic. For example, the support 5 comprises a wing as shown in FIG. 1. In FIG. 1, the first and second propellers 10, 15 are arranged at the leading edge of a wing. In another example, the first and second propellers 10, 15 are arranged at the trailing edge of the wing.

The first pitch PAS1 of the first blades 11 of the first propeller 10 is adjustable to adjust a first thrust P1 of the first propeller 10. Similarly, the second pitch PAS2 of the second blades of the second propeller 15 is adjustable to adjust a second thrust P2 of the second propeller 15. The first pitch PAS1 may be equal to a mean pitch component plus a differential pitch component, while the second pitch PAS2 may be equal to the mean pitch component minus the differential pitch component, or vice versa.

Furthermore, the hybrid helicopter 1 includes a power plant 30 for delivering power to the lift rotor 2 and to each propeller 10, 15. For this purpose, the power plant 30 includes at least one engine 31 that is controlled by a standard engine computer 32.

The term "computer" is used hereinafter to refer to a unit that may, for example, comprise at least one processor and at least one memory, at least one integrated circuit, at least one programmable system, and at least one logic circuit, these examples not limiting the scope given to the expression "computer". The term "processor" may refer equally to a central processing unit (CPU), a graphics processing unit (GPU), a digital signal processor (DSP), a microcontroller, etc.

In addition, the power plant 30 may include, for example inside an interconnection system, at least one gearbox, at least one shaft, and/or at least one member for interconnecting two members in rotation, etc. For example, one or more engines 31 are connected mechanically by one or more mechanical connection systems to a main gearbox 33 that rotates the lift rotor 2. Furthermore, the main gearbox 33 may be connected mechanically by at least one shaft to one lateral gearbox per propeller, which lateral gearbox is then connected in turn to a propeller 10, 15.

The speeds of rotation of the outputs of the engine or engines 31, of the propellers 10, 15, of the lift rotor 2, and of the mechanical interconnection system are optionally proportional to each other, the proportionality ratio optionally being constant regardless of the flight configuration of the hybrid helicopter 1 under normal operating conditions, i.e., except in the event of failure or during testing or training.

Furthermore, the hybrid helicopter 1 may include stabilizer or indeed maneuvering surfaces. For example, for fore-and-aft control, the hybrid helicopter 1 may include at least one substantially horizontal empennage 20, optionally provided with movable elevators 21.

For example, for steering, the hybrid helicopter 1 may include at least one aerodynamic stabilizer member 26 exerting a transverse lift P3, namely a lift comprising at least one component oriented transversely and optionally substantially parallel to the pitch axis of the hybrid helicopter. The aerodynamic stabilizer member 26 is able to rotate about an axis of rotation AXROT relative to a support 25. In the example shown, two aerodynamic stabilizer members 25 respectively comprise two flaps, each movable relative to a fixed vertical empennage portion. According to another possibility, an entire vertical empennage forms a deflectable aerodynamic stabilizer member 26. FIG. 1 thus shows stabilizer and indeed maneuvering surfaces forming an inverted-U-shaped rear structure. In another example shown in FIG. 4, the rear structure may be H-shaped. In another example, the rear structure may be T-shaped or equivalent and/or may include a single aerodynamic stabilizer member 26.

Furthermore, the hybrid helicopter 1 may include various controls to be piloted by a human pilot.

In particular, the hybrid helicopter 1 may include a control system for collectively and cyclically controlling the pitch of the main blades 3. Such a control system may, for example, include a set of swashplates. Thus, at each instant, the pitch of the main blades 3 may be equal to the sum of a collective pitch that is identical for all of the main blades 3 and a cyclic pitch that varies as a function of the azimuth of each main blade 3. The pitch of the main blades 3 is referred to as the "main pitch" so as to be clearly distinguished from the pitches of the other blades.

The hybrid helicopter 1 may therefore include a collective pitch control 45 that acts directly or indirectly on at least one mechanical and/or electrical control channel of the control system in order to cause the main pitch of the main blades 3 to vary collectively, where applicable via the set of swashplates. For example, the collective pitch control 45 comprises a lever.

Similarly, the hybrid helicopter 1 may include a cyclic pitch control 47 that acts directly or indirectly on one or more mechanical and/or electrical control channels of the control system in order to cause the main pitch of the main blades 3 to vary cyclically, where applicable via the set of swashplates.

Typically, the hybrid helicopter 1 may include controls connected to the control system for controlling the first pitch of the first blades 11 and the second pitch of the second blades 16.

Typically, the hybrid helicopter 1 may include a thrust control 50 that acts directly or indirectly on one or more mechanical and/or electrical control channels of the control system in order to cause the mean pitch component of the first pitch and of the second pitch to vary, for example in order to control a forward speed of the hybrid helicopter 1. FIG. 1 shows a thrust control 50 of the lever type, but the thrust control may also be in the form of a button generating an electrical or optical signal, for example.

Similarly, the hybrid helicopter 1 may include a yaw control 55 that that acts directly or indirectly on one or more mechanical and/or electrical yaw control channels of the control system in order to cause the differential pitch component of the first pitch of the first blades 11 and of the second pitch of the second blades 16 to vary. The yaw control channel or channels may include at least one actuator referred to for convenience as a "yaw cylinder 63".

Furthermore, the hybrid helicopter 1 includes an autopilot system 60 configured in particular to automatically control, i.e., without human intervention, the aerodynamic stabilizer member or members 26 by applying the method of the invention in order to optimize the operation and in particular the operating point of the first propeller 10 and of the second propeller 15.

Figure 2:
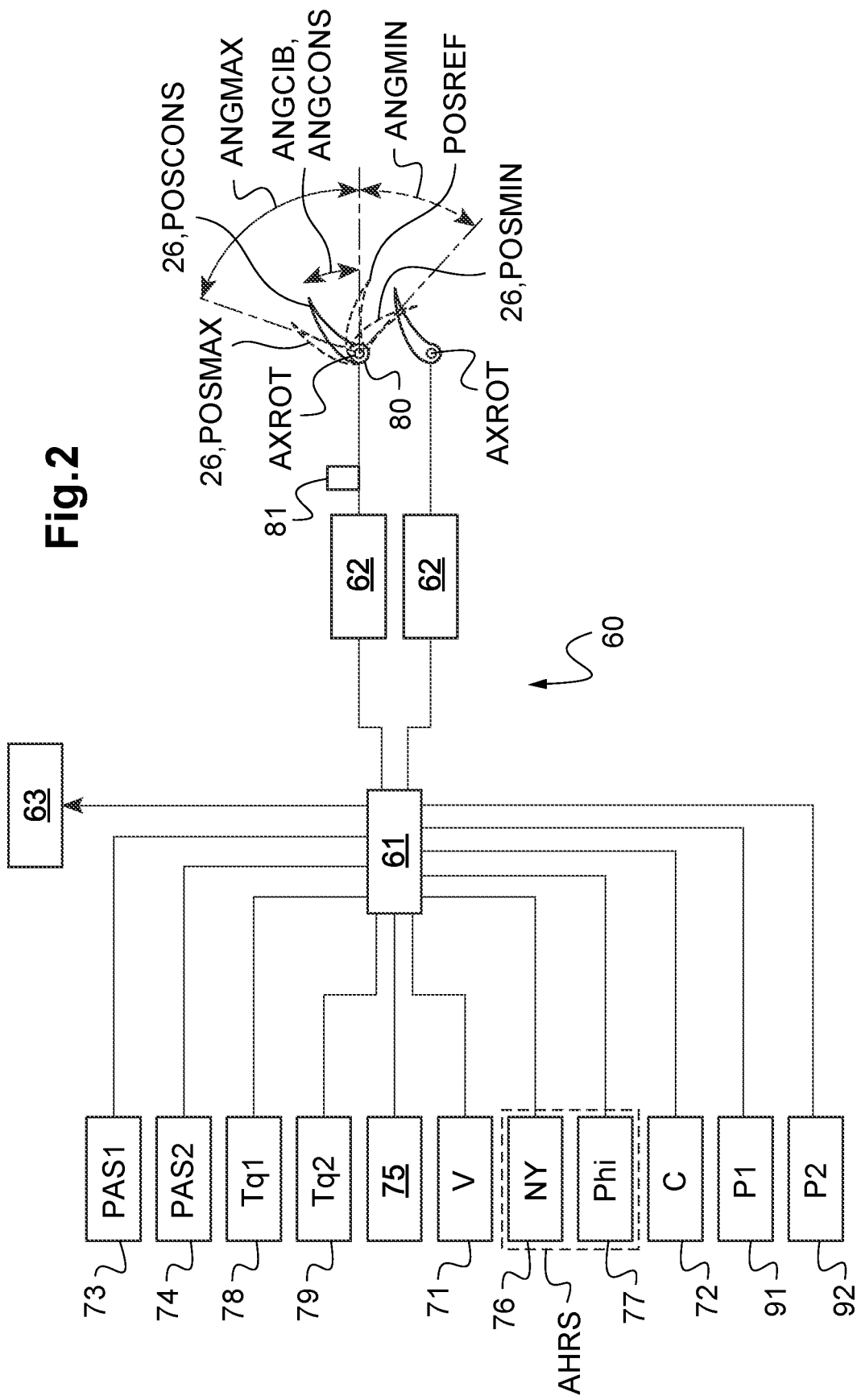
FIG. 2 is a diagram showing one embodiment of an autopilot system according to the invention.

FIG. 2 shows an example of an autopilot system 60.

This autopilot system 60 comprises at least one actuator 62 mechanically connected to at least one aerodynamic stabilizer member 26. For example, the autopilot system 60 comprises at least one actuator 62 per aerodynamic stabilizer member 26. Each actuator 62 may comprise a linear or rotary electric cylinder, a linear or rotary fluid cylinder cooperating with a fluid distributor, a linear or rotary electric motor, etc.

Each actuator 62 may cause at least one aerodynamic stabilizer member 26 to rotate about its axis of rotation AX. In particular, each actuator 62 may cause at least one aerodynamic stabilizer member 26 to rotate relative to a reference position POSREF shown in dashed lines. According to one example, each actuator 62 can deflect at least one aerodynamic stabilizer member 26 between a first position POSMIN having a negative minimum angle ANGMIN relative to a reference position POSREF and a second position POSMAX having a positive maximum angle ANGMAX relative to the reference position POSREF. For example, each aerodynamic stabilizer member 26 may be pivoted in an angular field of plus or minus 5 degrees centered on the reference position. The reference position POSREF therefore corresponds to the median position having a deflection angle of zero in which an aerodynamic stabilizer member 26 is situated with respect to the total angular field that can be covered. The reference position POSREF may, for example, correspond to the position to be reached during a cruising phase at a specific altitude and with a specific adjustment of the lift rotor in order to equalize the first thrust P1 and the second thrust P2.

At each instant, each aerodynamic stabilizer member 26 is in a current position resulting from a control of a target deflection angle which is determined in order to tend to equalize the first thrust P1 and the second thrust P2.

To this end, the autopilot system 60 may include at least one flight control computer 61 controlling each actuator 62. To determine an analog, digital, electrical, or optical control signal to be transmitted to each actuator 62, the flight control computer 61 may receive signals from various sensors.

Consequently, the autopilot system 60 may include one or more speed sensors 71 that transmit to the flight control computer an analog, digital, electrical, or optical signal carrying a forward speed of the hybrid helicopter 1. For example, the speed sensor measures a true airspeed of the hybrid helicopter 1.

The autopilot system 60 may include one or more torque sensors 72 that transmit to the flight control computer 61 an analog, digital, electrical, or optical signal carrying the torque exerted by the lift rotor 2 on the airframe 4.

The autopilot system 60 may include a first sensor 73 for detecting the first pitch PAS1 of the first blades 11 and a second sensor 74 for detecting the second pitch PAS2 of the second blades 16. For example, the first sensor 73 includes a position sensor that transmits to the flight control computer 61 an analog, digital, electrical, or optical signal that varies as a function of the position of a control shaft for controlling the first pitch of the first blades 11. Similarly, the second sensor 74 may include a position sensor that transmits to the flight control computer 61 an analog, digital, electrical, or optical signal that varies as a function of the position of a control shaft for controlling the second pitch of the second blades 16.

The flight control computer 61 may include at least one law or one database providing the first thrust P1 and the second thrust P2 as a function, respectively, of the first pitch PAS1 and of the second pitch PAS2, of the propeller speed and of the forward speed.

In another example, the flight control computer 61 may include at least one law or one database providing the first thrust P1 and the second thrust P2 as a function of forces measured by tension/compression sensors 91, 92 arranged on the propeller masts.

The autopilot system 60 may include a maneuvering sensor 75 capable of determining whether a pilot is maneuvering the yaw control 55. The maneuvering sensor 75 transmits to the flight control computer 61 an analog, digital, electrical, or optical signal that varies as a function of the position of or a force exerted on the yaw control 55. For example, the maneuvering sensor 75 comprises a force sensor, for example integrated into a cylinder actuating the rudder bar. The maneuvering sensor 75 returns a "TRUE" Boolean signal when the pilot is acting on the rudder bar and a "FALSE" Boolean signal when the pilot is not acting on the rudder bar.

The autopilot system 60 may include one or more sensors 76 for measuring load factor Ny in a transverse direction DIR in a reference frame of the hybrid helicopter 1. This sensor 76 for measuring a load factor Ny transmits to the flight control computer 61 an analog, digital, electrical, or optical signal that varies as a function of this lateral load factor Ny. The load factor measuring sensor 76 may comprise an acceleration sensor measuring the load factor Ny. This acceleration sensor can be part of the measuring instrument referred to as the "Attitude and Heading Reference System" (AHRS) or "Air Data, Attitude and Heading Reference System" (ADAHRS).

The autopilot system 60 may include one or more angular roll sensors 77 that transmit to the flight control computer 61 an analog, digital, electrical, or optical signal that varies as a function of the roll angle Phi of the hybrid helicopter 1. This angular roll sensor 77 can be part of the measuring instrument referred to as the "Attitude and Heading Reference System" (AHRS) or "Air Data, Attitude and Heading Reference System" (ADAHRS).

The autopilot system 60 may comprise at least first and second torque sensors 78, 79 for respectively measuring a first torque Tq1 of said at least one first propeller 10 and a second torque Tq2 of said at least one second propeller 15. Each torque sensor 78, 79 transmits to the flight control computer 61 an analog, digital, electrical, or optical signal that varies as a function of the torque generated or produced by the associated propeller 10, 15.

Optionally, the autopilot system 60 may comprise one sensor per aerodynamic stabilizer member 26, such as, for example, an angular sensor 80 or a sensor 81 estimating the position either of a movable member of the associated actuator 62 or of a link connecting the actuator 62 and the aerodynamic stabilizer member 26.

If necessary, and therefore as a function of the logic programmed in the flight control computer 61, this flight control computer 61 commands each actuator 62, during a control phase, to tilt the associated aerodynamic stabilizer member 26 into a setpoint position POSCONS having a target deflection angle ANGCIB with the reference position POSREF. The target deflection angle ANGCIB is a function of a setpoint deflection angle ANGCONS or even the maximum angle ANGMAX and the minimum angle ANGMIN.

Figure 3:
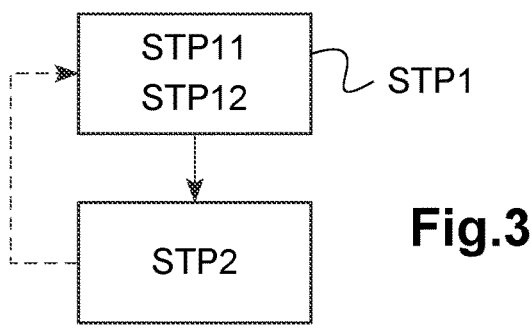
FIG. 3 is a flow chart showing the method of the invention.

With reference to FIG. 3, the method of the invention includes a control phase STP1. According to one possibility, the control phase is implemented permanently. According to another possibility, the control phase is implemented only during a cruising flight phase. Such a cruising flight phase may be identified by the flight control computer 61 in the usual manner, for example if the hybrid helicopter 1 has a forward speed greater than a stored/predetermined speed threshold. Thus, the method may include a step of comparing the forward speed with the speed threshold, the control phase being undertaken if the forward speed is greater than this speed threshold. For example, such a speed threshold may be equal to 100 knots or 185.2 kilometers per hour. In this case, outside the control phase, each aerodynamic stabilizer member 26 may for example be positioned in a predetermined position, and, by way of illustration, in the second position POSMAX, for example.

The control phase may be performed iteratively at a predetermined frequency.

During this control phase STP1, the method includes a step STP12 of deflecting each aerodynamic stabilizer member 26 into the setpoint position POSCONS, with the autopilot system 60. The target deflection angle ANGCIB to be reached is then equal to a setpoint deflection angle ANGCONS, at least when this setpoint deflection angle ANGCONS is within the range of permitted values limited by the predetermined minimum angle ANGMIN and the predetermined maximum angle ANGMAX.

The setpoint deflection angle ANGCONS is calculated by the autopilot system 60 to correspond to the angle to be reached in order to compensate for a torque exerted by said lift rotor 2 at zero sideslip with the aerodynamic stabilizer member or members 26.

Consequently, the control phase STP1 may comprise, prior to the deflection step STP12, a step STP11 of calculating the setpoint deflection angle ANGCONS, with the autopilot system 60. The flight control computer 61 may apply at least one law to this end, such a law being able, for example, to take the form of a series of stored instructions, of a table of values, etc. The value of the setpoint deflection angle ANGCONS may depend on the forward speed of the hybrid helicopter 1 measured with the speed sensor 71, on the torque exerted by the lift rotor 2 on the airframe 4 measured by the torque sensor 72, and on a volumic mass of the air surrounding said hybrid helicopter 1.

Optionally, the autopilot system 60 calculates the setpoint deflection angle ANGCONS with the following relation:

$$\text{delta}V = (C/(0.5*ro*v^2) - N1)/(N2),$$

where "deltaV" represents said setpoint deflection angle ANGCONS, "C" represents a torque exerted by the lift rotor 2 on the airframe 4, "$V^2$" represents a forward speed of the hybrid helicopter 1, squared, "ro" represents a volumic mass of the air, "$0.5*ro*v^2$" represents a dynamic pressure, "N1" represents a first coefficient which is a function of an aerodynamic yaw moment N0 of the hybrid helicopter 1 at zero sideslip and, when said at least one aerodynamic stabilizer member 26 is in the reference position POSREF, reduced by the dynamic pressure q, "N2" represents a constant, "/" represents the division sign, "−" represents the subtraction sign, "*" represents the multiplication sign, represents the equals sign.

The setpoint deflection angle may be limited by a minimum angle ANGMIN and a maximum angle ANGMAX.

The first coefficient may be equal to the aerodynamic yaw moment N0 of the hybrid helicopter 1 at zero sideslip and, when said at least one aerodynamic stabilizer member 26 is in the reference position POSREF, reduced by the dynamic pressure q, i.e., N1=N0/q. Consequently, the first coefficient may be a constant evaluated by trials and/or calculations and/or simulations.

Alternatively, this aerodynamic yaw moment N0 of the hybrid helicopter 1 at zero sideslip and, when said at least one aerodynamic stabilizer member 26 is in the reference position POSREF, reduced by the dynamic pressure q, can be corrected by an optionally capped integral corrector.

For example, said first coefficient is determined by the following relation:

$$N1 = (N0/q) + k*\text{int}(\textit{diff}),$$

where "N1" represents the first coefficient, "N0/q" represents the aerodynamic yaw coefficient of the hybrid helicopter 1 reduced by the dynamic pressure at zero sideslip and when said at least one aerodynamic stabilizer member 26 is in the reference position POSREF, "diff" represents a subtraction equal either to the first pitch PAS1 of the first blades 11 minus a second pitch PAS2 of the second blades or to a first thrust P1 exerted by said at least one first propeller 10 minus a second thrust P2 exerted by said at least one second propeller 15 or to a first torque Tq1 exerted by said at least one first propeller 10 minus a second torque Tq2 exerted by said at least one second propeller, "k" represents a predetermined gain, "−" represents the subtraction sign, "+" represents the addition sign, "*" represents the multiplication sign, "=" represents the equals sign, "k*int(diff)" represents the integral corrector equal to the product of said predetermined gain and an integral with respect to the time of the subtraction.

Depending on the variant, said first coefficient is therefore determined by the following relation:

$$N1 = (N0/q) + k*\text{int}(\textit{PAS1}-\textit{PAS2}); \text{ or}$$

$$N1 = (N0/q) + k*\text{int}(\textit{P1}-\textit{P2}); \text{ or}$$

$$N1 = (N0/q) + k*\text{int}(\textit{Tq1}-\textit{Tq2}).$$

Regardless of the variant, the gain k may be fixed or variable. For example, the gain k varies as a function of a forward speed of the hybrid helicopter 1.

In addition, the corrector may be frozen when the hybrid helicopter 1 enters a dynamic piloting phase. The flight control computer 61 may consider that such a dynamic piloting phase is implemented as long as at least one of the following three conditions is satisfied:

maneuvering of the yaw control 55, this maneuvering being identified via a signal transmitted by the maneuvering sensor 75;

the absolute value of the load factor Ny in the transverse direction DIR is greater than a load factor threshold, this load factor being measured by the load factor measuring sensor 76; and the absolute value of the roll angle of the hybrid helicopter 1 is greater than a roll threshold, this roll angle being measured by the angular roll sensor 77.

Alternatively, or additionally, the corrector may be frozen when an absolute value of a difference is less than a freeze threshold. This difference may be equal to the first pitch PAS1 minus the second pitch PAS2, or to the first thrust P1 minus the second thrust P2, or to the first torque exerted by said at least one first propeller 10 minus the second torque exerted by said at least one second propeller 15.

Figure 4:
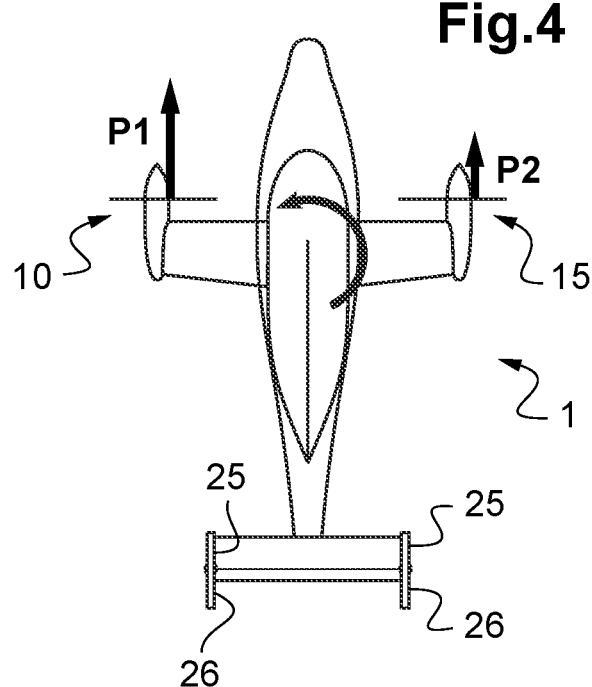
FIG. 4 is a diagram showing a hybrid helicopter prior to the deflection of an aerodynamic stabilizer member.

Consequently, and with reference to FIG. 4, before the control phase, each aerodynamic stabilizer member 26 may be in a position that does not allow the first thrust P1 and the second thrust P2 to be equalized.

Figure 5:
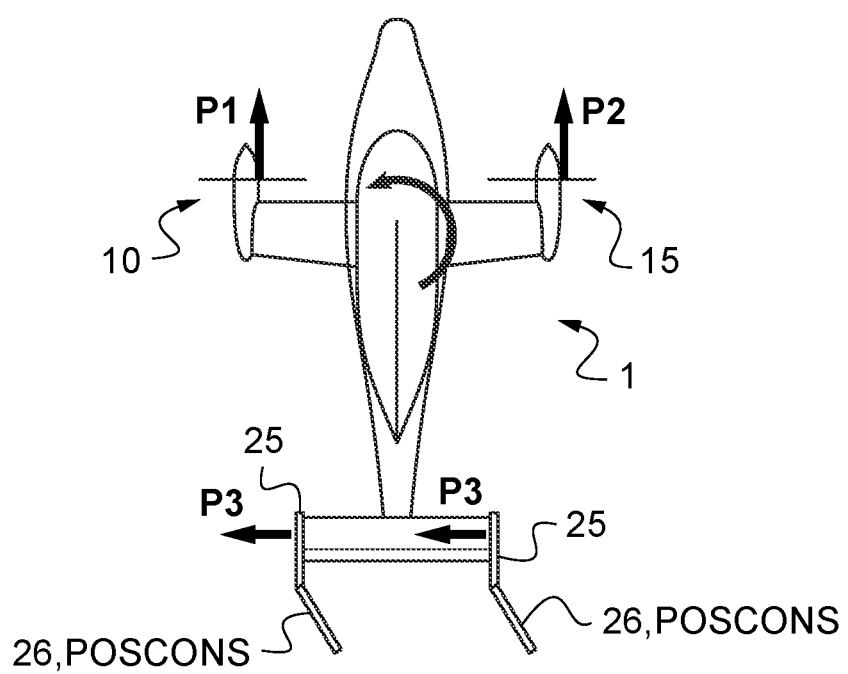
FIG. 5 is a diagram showing a hybrid helicopter following the deflection of an aerodynamic stabilizer member.

With reference to FIG. 5, during the implementation of the control phase, each aerodynamic stabilizer member 26 is deflected into its setpoint position POSCONS via an open control loop, which therefore allows the first thrust P1 and the second thrust P2 to be equalized.

In parallel, the method can implement a step STP2 for controlling the lateral load factor Ny. To this end, the flight control computer 61 may transmit a signal to at least one yaw cylinder 63, this signal being determined by a standard fast closed control loop.

Naturally, the present invention is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present invention.

What is claimed is:

1. A method for optimizing the operation of at least one first propeller and of at least one second propeller, which are arranged transversely on either side of an airframe of a hybrid helicopter, the hybrid helicopter including a lift rotor arranged above the airframe, the hybrid helicopter including at least one aerodynamic stabilizer member exerting a transverse lift, the aerodynamic stabilizer member being able to rotate relative to a support of the hybrid helicopter, the method comprising the following step during a control phase: deflection, with an autopilot system, of the aerodynamic stabilizer member into a setpoint position having, with respect to a reference position, a target deflection angle,
wherein the target deflection angle is equal to a setpoint deflection angle at least when this setpoint deflection angle is within a range delimited by an included predetermined minimum angle and an included predetermined maximum angle, the setpoint deflection angle being calculated by the autopilot system in order to compensate for a torque exerted by the lift rotor at zero sideslip.

2. The method according to claim 1,
wherein the method comprises the following step: calculation of the setpoint deflection angle, with the autopilot system, as a function at least of a forward speed of the hybrid helicopter, of a torque exerted by the lift rotor on the airframe, and of a volumic mass of the air surrounding the hybrid helicopter.

3. The method according to claim 1,
wherein the method comprises a step of calculating the setpoint deflection angle, with the autopilot system, by means of the following relation:

$$\text{delta}V=(C/(0.5*ro*v^2)-N1)/(N2),$$

where "deltaV" represents the setpoint deflection angle ANGCONS, "C" represents a torque exerted by the lift rotor on the airframe, "$V^2$" represents a forward speed of the hybrid helicopter, squared, "ro" represents a volumic mass of the air, "$0.5*ro*v^2$" represents a dynamic pressure, "N1" represents a first coefficient which is a function of an aerodynamic yaw moment of the hybrid helicopter at zero sideslip and when the aerodynamic stabilizer member is in the reference position, reduced by the dynamic pressure, "N2" represents a second coefficient equal to a constant, "/" represents the division sign, "−" represents the subtraction sign, "*" represents the multiplication sign, "=" represents the equals sign.

4. The method according to claim 3,
wherein the first coefficient is equal to the aerodynamic yaw moment of the hybrid helicopter, reduced by the dynamic pressure, at zero sideslip and when the aerodynamic stabilizer member is in the reference position.

5. The method according to claim 3,
wherein the first coefficient is equal to the aerodynamic yaw moment of the hybrid helicopter, reduced by the dynamic pressure and corrected by an integral corrector, at zero sideslip and when the aerodynamic stabilizer member is in the reference position; the corrector being a function of a gain as well as of a subtraction either of a first pitch of first blades of the first propeller minus a second pitch of second blades of the second propeller, or of a first thrust exerted by the first propeller minus a second thrust exerted by the second propeller, or of a first torque exerted by the first propeller, minus a second torque exerted by the second propeller.

6. The method according to claim 5,
wherein the first coefficient is determined by the following relation:

$$N1=(N0/q)+k*\text{int}(\textit{diff}),$$

where "N1" represents the first coefficient, "N0/q" represents the aerodynamic yaw moment NO of the hybrid helicopter, reduced by the dynamic pressure q, at zero sideslip and when the aerodynamic stabilizer member is in the reference position, "diff" represents the subtraction, "k" represents a predetermined gain, "−" represents the subtraction sign, "+" represents the addition sign, "*" represents the multiplication sign, "=" represents the equals sign, "k*int(diff)" represents the integral corrector equal to a product of the predetermined gain and an integral with respect to the time of the subtraction.

7. The method according to claim 5,
wherein the gain varies as a function of a forward speed of the hybrid helicopter.

8. The method according to claim 5,
wherein the corrector is frozen when the hybrid helicopter is in a dynamic piloting phase.

9. The method according to claim 8,
wherein the method comprises a step of detecting a dynamic piloting phase if at least one of the following conditions is satisfied:
maneuvering of a yaw control configured to modify a differential pitch component of the first pitch of the first blades of the first propeller and of the second pitch of the second blades of the second propeller;
an absolute value of a load factor in a transverse direction in a reference frame of the hybrid helicopter is greater than a load factor threshold; and
an absolute value of a roll angle of the hybrid helicopter is greater than a roll threshold.

10. The method according to claim 5,
wherein the corrector is frozen when an absolute value of a difference is less than a freeze threshold, the difference being equal:
to the first pitch of the first blades of the first propeller minus the second pitch of the second blades of the second propeller;
or to the first thrust exerted by the first propeller minus the second thrust exerted by the second propeller; and
or to the first torque exerted by the first propeller minus the second torque exerted by the second propeller.

11. The method according to claim 1,
wherein the control phase is implemented when the hybrid helicopter is carrying out a cruising flight phase.

12. The method according to claim 1,
wherein the deflection of the aerodynamic stabilizer member into a setpoint position, with the autopilot system, is achieved by applying an open control loop.

13. A hybrid helicopter provided with at least one first propeller and with at least one second propeller which are arranged transversely on either side of an airframe of this hybrid helicopter, the hybrid helicopter including a lift rotor arranged above the airframe, the hybrid helicopter including at least one aerodynamic stabilizer member exerting a transverse lift, the aerodynamic stabilizer member(s) being able to rotate relative to a support of the hybrid helicopter,
wherein the hybrid helicopter comprises an autopilot system configured to apply the method according to claim 1, the autopilot system comprising a flight control computer configured to apply the method according to claim 1, the autopilot system comprising at least one actuator connected to the aerodynamic stabilizer member and to the flight control computer.

14. The hybrid helicopter according to claim 13,
wherein the autopilot system comprises at least one instance of at least one of the following components, connected to the flight control computer: a speed sensor, a torque sensor configured to measure information relating to a torque exerted by the lift rotor, a first sensor for detecting the first pitch of first blades of the first propeller, a second sensor for detecting the second pitch of second blades of the second propeller, a maneuvering sensor for determining whether a pilot is maneuvering a yaw control, a sensor for measuring a load factor in a transverse direction in a reference frame of the hybrid helicopter, an angular roll sensor measuring a roll angle of the hybrid helicopter, first and second torque sensors for detecting the torque respectively of the first propeller and of the second propeller, a first thrust sensor for evaluating a first thrust generated by the first propeller, a second thrust sensor for evaluating a second thrust generated by the second propeller.

15. A method for optimizing the operation of a first propeller and of a second propeller arranged transversely on either side of an airframe of a hybrid helicopter, the hybrid helicopter including a lift rotor arranged above the airframe, the hybrid helicopter including an aerodynamic stabilizer member being able to exert a transverse lift, the aerodynamic stabilizer member being able to rotate relative to a support of the hybrid helicopter, the method comprising during a control phase:

deflection, with an autopilot system, of the aerodynamic stabilizer member into a setpoint position having, with respect to a reference position, a target deflection angle equal to a setpoint deflection angle when the setpoint deflection angle is within a range delimited by an included predetermined minimum angle and an included predetermined maximum angle, the setpoint deflection angle being calculated by the autopilot system in order to compensate for a torque exerted by the lift rotor at zero sideslip.

16. The method according to claim 15, wherein the method comprises calculation of the setpoint deflection angle, with the autopilot system, as a function of a forward speed of the hybrid helicopter, of a torque exerted by the lift rotor on the airframe, and of a volumic mass of the air surrounding the hybrid helicopter.

17. The method according to claim 15, wherein the method comprises calculating the setpoint deflection angle, with the autopilot system, by the following relation:

$$\text{delta}V = (C/(0.5 \ast ro \ast v^2) - N1)/(N2),$$

where "deltaV" represents the setpoint deflection angle ANGCONS, "C" represents a torque exerted by the lift rotor on the airframe, "V²" represents a forward speed of the hybrid helicopter, squared, "ro" represents a volumic mass of the air, "0.5*ro*v²" represents a dynamic pressure, "N1" represents a first coefficient which is a function of an aerodynamic yaw moment of the hybrid helicopter at zero sideslip and when the aerodynamic stabilizer member is in the reference position, reduced by the dynamic pressure, "N2" represents a second coefficient equal to a constant, "/" represents the division sign, "−" represents the subtraction sign, "*" represents the multiplication sign, "=" represents the equals sign.

18. The method according to claim 17, wherein the first coefficient is equal to the aerodynamic yaw moment of the hybrid helicopter, reduced by the dynamic pressure, at zero sideslip and when the aerodynamic stabilizer member is in the reference position.

19. The method according to claim 17, wherein the first coefficient is equal to the aerodynamic yaw moment of the hybrid helicopter, reduced by the dynamic pressure and corrected by an integral corrector, at zero sideslip and when the aerodynamic stabilizer member is in the reference position; the corrector being a function of a gain as well as of a subtraction either of a first pitch of first blades of the first propeller minus a second pitch of second blades of the second propeller, or of a first thrust exerted by the first propeller minus a second thrust exerted by the second propeller, or of a first torque exerted by the first propeller, minus a second torque exerted by the second propeller.

20. The method according to claim 19, wherein the first coefficient is determined by the following relation:

$$N1 = (N0/q) + k \ast \text{int}(\textit{diff}),$$

where "N1" represents the first coefficient, "N0/q" represents the aerodynamic yaw moment N0 of the hybrid helicopter, reduced by the dynamic pressure q, at zero sideslip and when the aerodynamic stabilizer member is in the reference position, "diff" represents the subtraction, "k" represents a predetermined gain, "−" represents the subtraction sign, "+" represents the addition sign, "*" represents the multiplication sign, "=" represents the equals sign, "k*int(diff)" represents the integral corrector equal to a product of the predetermined gain and an integral with respect to the time of the subtraction, wherein the gain varies as a function of a forward speed of the hybrid helicopter, and wherein the corrector is frozen when the hybrid helicopter is in a dynamic piloting phase.

* * * * *